US007680955B2

(12) United States Patent
Huang et al.

(10) Patent No.: US 7,680,955 B2
(45) Date of Patent: *Mar. 16, 2010

(54) SCIT-DNS: CRITICAL INFRASTRUCTURE PROTECTION THROUGH SECURE DNS SERVER DYNAMIC UPDATES

(75) Inventors: Yih Huang, Fairfax, VA (US); David Arsenault, Reston, VA (US); Arun Sood, Clifton, VA (US)

(73) Assignee: George Mason Intellectual Properties, Inc., Fairfax ( * ) Notice: Subject to any disclaimer, the term of this patent is extended or adjusted under 35 U.S.C. 154(b) by 785 days.

This patent is subject to a terminal disclaimer.

(21) Appl. No.: 11/290,784

(22) Filed: Dec. 1, 2005

(65) Prior Publication Data
US 2006/0143711 A1    Jun. 29, 2006

Related U.S. Application Data

(60) Provisional application No. 60/631,883, filed on Dec. 1, 2004.

(51) Int. Cl.
*G06F 15/16* (2006.01)
(52) U.S. Cl. ..................................... 709/245
(58) Field of Classification Search .................. 709/245
See application file for complete search history.

(56) References Cited

U.S. PATENT DOCUMENTS 6,324,161 B1 * 11/2001 Kirch ......................... 370/217

| | | | | |
|---|---|---|---|---|
| 6,473,396 B1 * | 10/2002 | Kumar | ........................ | 370/220 |
| 6,622,257 B1 * | 9/2003 | Rollins et al. | .................. | 714/4 |
| 6,880,089 B1 * | 4/2005 | Bommareddy et al. | ........ | 726/11 |
| 6,941,487 B1 * | 9/2005 | Balakrishnan et al. | ......... | 714/4 |
| 6,973,586 B2 * | 12/2005 | Petersen et al. | ................ | 714/6 |
| 6,976,093 B2 * | 12/2005 | Lara et al. | .................... | 709/248 |
| 2002/0010798 A1 * | 1/2002 | Ben-Shaul et al. | .......... | 709/247 |
| 2002/0145993 A1 * | 10/2002 | Chowdhury et al. | ......... | 370/338 |
| 2004/0111636 A1 * | 6/2004 | Baffes et al. | ................ | 713/201 |

OTHER PUBLICATIONS

Y. Huang and A. Sood "Self-Cleansing Systems for Intrusion Containment", Workshop on Self-Healing, Adaptive and self-MANaged Systems (SHAMAN), New York City, NY Jun. 23, 2002.*

* cited by examiner

*Primary Examiner*—William C Vaughn, Jr.
*Assistant Examiner*—Boris Gorney
(74) *Attorney, Agent, or Firm*—David Yee; David Grossman

(57) ABSTRACT

Disclosed is a self-cleansing intrusion tolerance-domain name systems system comprising at least three DNS servers, at least four storage systems accessible by the DNS servers, a communications link, a message transfer mechanism, and a self-cleansing mechanism. The storage systems include at least three online storage systems and at least one offline storage system. The communications link can connect the DNS servers with the storage systems, as well as connect the DNS servers with a local area network, which can connect the DNS servers with an external network. The message transfer mechanism can rotate the DNS servers into a plurality of roles, including a primary role, a secondary role, a designated role, and a self-cleansing role. The self-cleansing mechanism can be used to perform the self-cleansing role.

9 Claims, 13 Drawing Sheets

SCIT-DNS: CRITICAL INFRASTRUCTURE PROTECTION THROUGH SECURE DNS SERVER DYNAMIC UPDATES

CROSS-REFERENCE TO RELATED APPLICATIONS

The present application claims the benefit of provisional patent application Ser. No. 60/631,883 to Huang et al., filed on Dec. 1, 2004, entitled "SCIT-DNS: Critical Infrastructure Protection through Secure DNS Server Dynamic Updates," which is hereby incorporated by reference.

STATEMENT REGARDING FEDERALLY SPONSORED RESEARCH OR DEVELOPMENT

This invention was made with government support under Grant # 60NANB2D0108 awarded by the National Institute of Standards and Technology. The government has certain rights in the invention.

BACKGROUND OF THE INVENTION

As the world becomes more dependent on network-based services for critical applications, particularly via Transmission Control Protocol/Internet Protocol (TCP/IP) networks, it becomes more vital to protect Domain Name Systems (DNS) from attacks and failures. Unfortunately, popular DNS implementations are known to be targeted based on numerous vulnerabilities, exploits and attacks.

DNS is essentially a distributed database. Each name server can maintain domain name information regarding a subspace, or a zone, in the DNS name space. Several predefined properties, or resource records (RR), can be associated with a domain name. An example of an RR is "type A" RR, which may contain an IP address of the domain. Generally, RRs pertaining to domain names in a zone are stored in a master file, which can be maintained by the primary name server of such zone. Each zone can also have one or more secondary name servers, which can periodically synchronize their local DNS file with the master file. Ordinarily, secondary name servers respond to DNS queries. However, they may not be involved in maintaining the master file.

The DNS architecture was later enhanced with DNS Security Extensions (DNSSEC) to provide data origin authentication. With DNSSEC, each zone can be equipped with at least a pair of public and private keys. The public key may be configured into every client in the zone through a safe channel (e.g., manually by administrators). The private key may be used to digitally sign RRs. A response to a DNS query may include requested RRs and a digital signature of the requested RRs, which is also known as "Sig RR." DNS clients can verify the integrity and origin of received DNS data by checking accompanying signatures using the zone public key.

The integrity of the above approach may depend on the secrecy of participating private keys. Maintenance of private keys is usually maximized by keeping them offline. In this position, even if a server is compromised, a hacker is not likely able to procure the private key and temper with DNS data. However, the hacker may still be able to attack the server in other respects, such as deleting the master file as a denial of service attack or using the server as a jump pad to machines inside the intranet.

Additionally, it is preferable to have signature computations offline. This position may best suit domain names that are created and managed manually via administrative procedures (e.g., one registers for a new domain name, fills out a form, pays a fee, etc.). Offline signature computation, however, may not be compatible with dynamic domain name updates, where RRs can be updated in real time upon online requests from clients.

Under DNSSEC standards, different modes can be used to compute signatures of dynamically updated RRs. In Mode A, a per-server private key is used to sign dynamic updates. The corresponding public key is stored in a Key RR associated with the domain name of the server. This key may be obtained by the client through DNS requests. In this way, server compromises can only jeopardize dynamically updated resource records. However, server keys are not typically considered as authoritative zone keys. In Mode B, the zone private key may be kept online and used to sign dynamic updates. This feature may leave the key subject to exposure through network attacks. In the face of server compromises, the integrity of the entire master file may be in question.

In addressing these problems, what is needed is a secure framework of DNS servers that does not require private keys to be kept online to sign dynamic updates. Also, it is desirable to have a secure framework that would hinder further attacks on the server. Such framework can help maintain the availability and integrity of any critical communications infrastructure.

BRIEF SUMMARY OF THE INVENTION

One advantage of the present invention is that it provides a defense against unknown or severe attacks that may defeat intrusion detection systems.

Another advantage of this invention is that it may protect dynamically updated resource records using offline zone private keys.

A further advantage of this invention is that it may be used in many different networking computing environments such as firewalls and servers.

To achieve the foregoing and other advantages, in accordance with all of the invention as embodied and broadly described herein, is a self-cleansing intrusion tolerance-domain name systems system comprising: at least three DNS servers, at least four storage systems, a communications link, a message transfer mechanism and a self-cleansing mechanism. The storage systems include at least an offline storage system and three online storage systems. The communications link can connect the DNS servers with the storage systems. In addition, the communications link can connect the DNS servers with a local area network. The local area network may be able to connect the DNS servers with an external network. The transfer mechanism can rotate the roles of the DNS servers. Roles include a primary role, a secondary role, a designated role, and a self-cleansing role. The self-cleansing mechanism can be used to perform the self-cleansing role.

In addition, the system can have a firewall. The DNS servers may receive dynamic update requests from an external network. These requests can be stored in the online storage systems. Some of the DNS servers may answer DNS queries. The communications link may be part of the local are network. The message transfer mechanism may be activated using one or more transfer criterions. Examples of transfer criterions include one or messages, fault detection criterion, intrusion detection criterion, and time. The system may even further include a known clean copy.

In yet a further aspect of the invention, a method of self-cleansing a DNS server can include the following steps: rebooting; loading one or more protectee files from at least one known clean copy; performing system integrity checking; connecting to at least one offline storage system and retrieving a zone private key; connecting to at least one online storage system; processing at least one pending request of at least one dynamic update; updating a master file; generating a copy of the updated master file in a local file system of at least one DNS server; disconnecting from the offline storage system and online storage system; eliminating traces of the zone private key by reinitializing one or more disck blocks and memory pages used to store the zone private key; connecting to an online storage system for storing one or more dynamic updates when one or more DNS servers perform a primary role; initiating role rotation; and using the IP address of a designated server.

Moreover, the method can include using the zone private key to recomputed one or more signatures of one or more affected resource records. Also, the method can include one or more DNS servers receiving instructions for the role rotation.

In yet another aspect of the invention, operable instructions for role rotation can be stored on a tangible computer readable medium. These instructions include: having a server in a self-cleansing role instruct a server in a primary role to assume another role; having the server in the self-cleansing role transition into a server having a primary role; having a server in a primary role instruct a server in a secondary role to reboot; and having the server in the primary role transition into a server having a secondary role.

Other instructions may include self-cleansing; cleaning the memory of the server having a secondary role in response to rebooting; and reloading one or more protectee files after reboot. Furthermore, the server having a primary role can acknowledge the rotate role instructions sent by the server having a self-cleansing role. Similarly, the server having a secondary role can acknowledge the reboot instructions sent by the server having a primary role.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
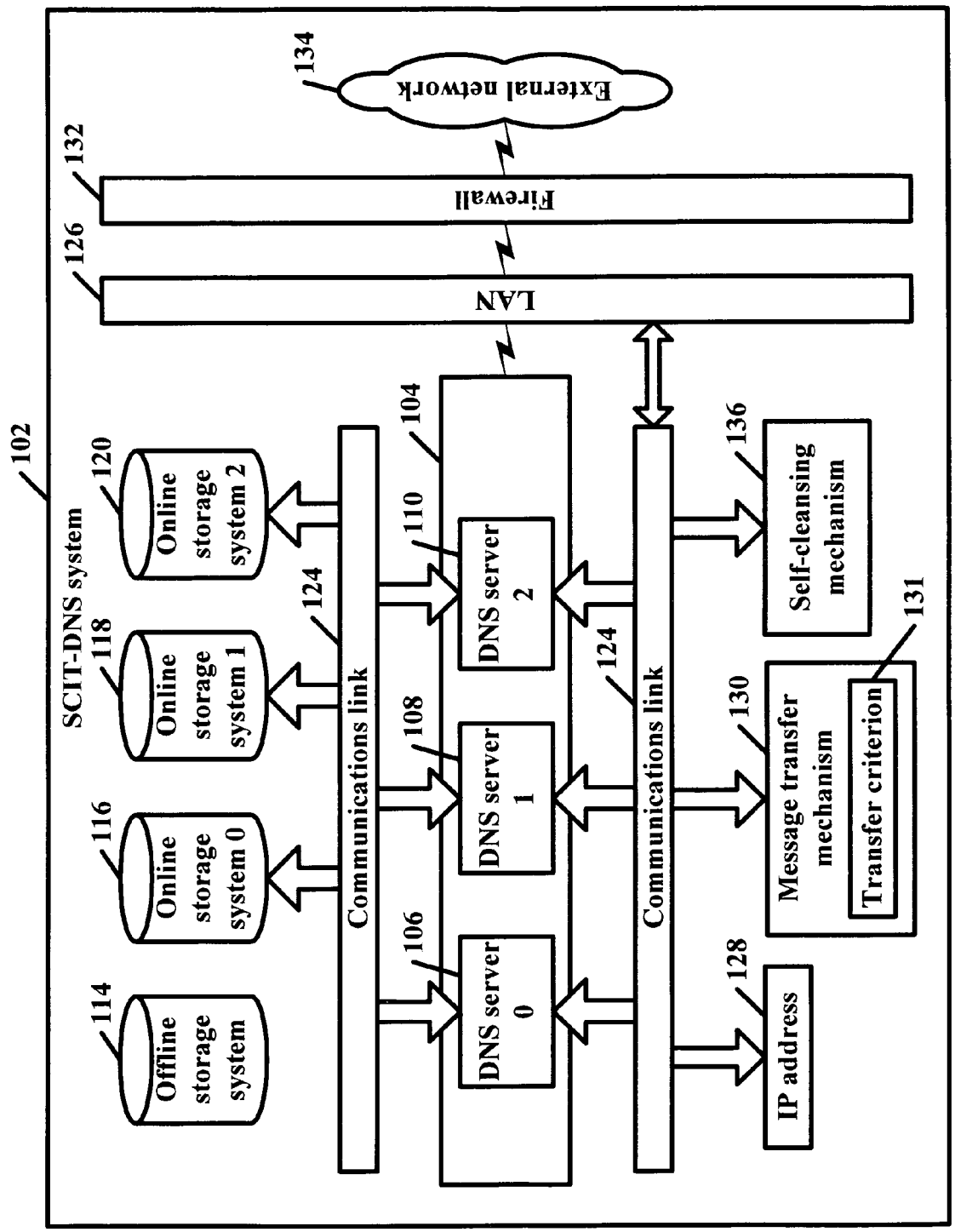
FIG. 1 shows a block diagram of a Self-Cleansing Intrusion Tolerance-domain Name Systems (SCIT-DNS) system as per an embodiment of the present invention.

The present invention is a secure framework of DNS servers that uses an approach called Self-Cleansing Intrusion Tolerance (SCIT). The framework may be based on at least one server or at least one cluster of servers, either of which can constantly rotate the role of individual servers. The framework can handle one-server failures, confine damages of successful intrusion and digitally sign dynamic updates by a clean server using a DNS zone key while keeping the key offline at all times.

SCIT is a system that uses alternating subsystems. A subsystem, such as a server, may be periodically assumed to have "failed," namely compromised by undetected intrusion. Thus, the "failed" server may be brought offline for cleansing and integrity checking.

SCIT uses a cluster of servers and can constantly rotate the role of each server. At any point in time, a particular server may be the primary server, the secondary server, or be in the process of rebooting (sometimes referred to herein as "restart" or "restarting") and self-cleansing.

SCIT may periodically restart the system. The restart can reload one or more known clean copies. A known clean copy is any critical "protectee" file that must be fully intact and uncorrupted for correct system operation. Examples include, but are not limited to, the operating system, service software and data from trusted media The trusted media can be any non-writable media or writable media combined with digital signatures to verify the integrity of data. In addition to reloading, system auditing and recovery procedures may occur. During the cleansing process, a backup server may be brought online to provide uninterrupted services. In many aspects, SCIT is close to high-availability computing, which can use backup systems to ensure continued customer services in the face of primary server failures. With SCIT, null failure events can be introduced to force periodic takeover(s) by the backup server and the cleansing of the primary server.

Periodic cleansing may be necessary to force an online server to return to a known, clean state, regardless of the detection of (or lack thereof) an intrusion. An underlying assumption is that cyber attacks can always be present. Moreover, these kinds of attacks can be sophisticated and stealthy enough to penetrate even the best security measures while avoiding being detected by the most advanced intrusion detection systems. While this "paranoid" attitude may raise alarming concerns for an average computer user, it may be appropriate for critical infrastructures, such as DNS. Just as a software tester's job is to assume the existence of bugs and contrive to uncover them, SCIT seeks to solve undetected security breaches in online systems and takes actions accordingly.

SCIT may incorporate one of more "SCIT clusters." A SCIT cluster is a set of server boxes connected through one or more local area networks, working cooperatively and/or alternately to perform a set of predefined services.

Where a SCIT cluster is associated with DNS, this combination may be referred to as a SCIT-DNS cluster. In one embodiment, as exemplified in FIGS. 1 and 2, a SCIT-DNS cluster 104 of the present invention may include, but is not limited to, three DNS servers (which may identical to each other) running in a demilitarized zone (DMZ) configuration behind a firewall.

SCIT-DNS clusters may exhibit numerous advantages. For example, SCIT-DNS clusters may provide key protection. Zone private keys may be kept offline even though they may be used to sign dynamic updates. By keeping these keys offline, the highest level security for dynamically RR may be attained. Primary server compromises are not likely to expose one or more zone private keys. Moreover, these compromises usually do not degrade data origin authentication.

A second advantage is high availability. The system can gracefully handle the failure of one server. In the presence of one server failure, the system may stop role rotation or even the initiation of role rotation. Stoppage may result because of no newly cleansed machine to send role rotation messages, such as ROTATE_ROLE. Dynamic updates may, however, be postponed until the third server is repaired. Once repaired, role rotation may be activated again.

A third advantage is intrusion tolerance. Even if a hacker manages to breach a server, such as the current server, the hacker is likely able to only inflict damage for a limited time. For example, if the hacker deletes the online copy of the master file, which may be stored in the primary server, services may be restored when the next primary server takes over. Furthermore, infectious programs (such as computer viruses, Trojan horses, worms, macros, etc.) may be detected and removed through system auditing after rebooting. Moreover, if the hacker attempts to use the server as a jump pad to the intranet, the hacker may lose her foothold in a short period of time.

The DNS zone running the cluster can advertise two IP addresses of DNS servers, namely a primary name server address and a secondary name server address. It can also advertise two domain names for the primary and secondary servers, such as ns1.demo.com and ns2.demo.com, respectively. Yet, the present invention is not limited to only the advertisement of two IP addresses of DNS servers. Rather, the present invention has the option of advertising one or an infinitesimal number of IP addresses of DNS servers.

Figure 3:
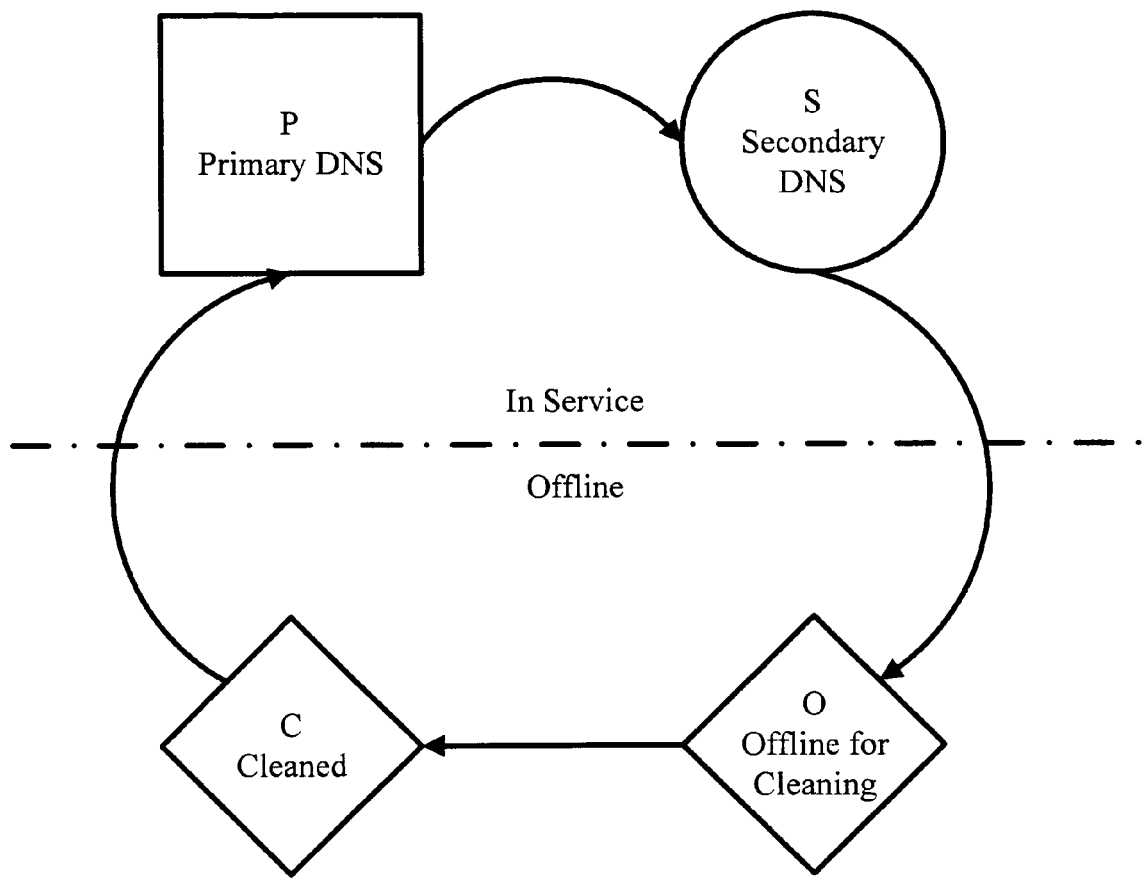
FIG. 3 shows a flow diagram of operating mode rotations.

Each of the DNS servers in the cluster may cycle through multiple operating states, including, but not limited to, Primary DNS, Secondary DNS, and Offline for cleansing and integrity checking. As shown in FIG. 3, at any point in time, only one of the DNS servers may be operating in any one mode. When a server enters an operation mode, it may assume the identities required by that mode.

For instance, when a newly cleansed server becomes the primary, it claims an IP address 128 and domain name of the primary name server. The IP address 128 can be dynamically claimed by a machine using a particular protocol, such as the VRRP protocol, or a particular message, such as the Gratuitous ARP message. DNS clients may use either of the two server identities when communicating with the cluster. The server that assumes the identity specified in a query at the time of receiving the query usually answers that query. Furthermore, the bindings between DNS server domain names and respective IP addresses generally do not change. However, what may change is the machine that assumes each identity.

Figure 2:
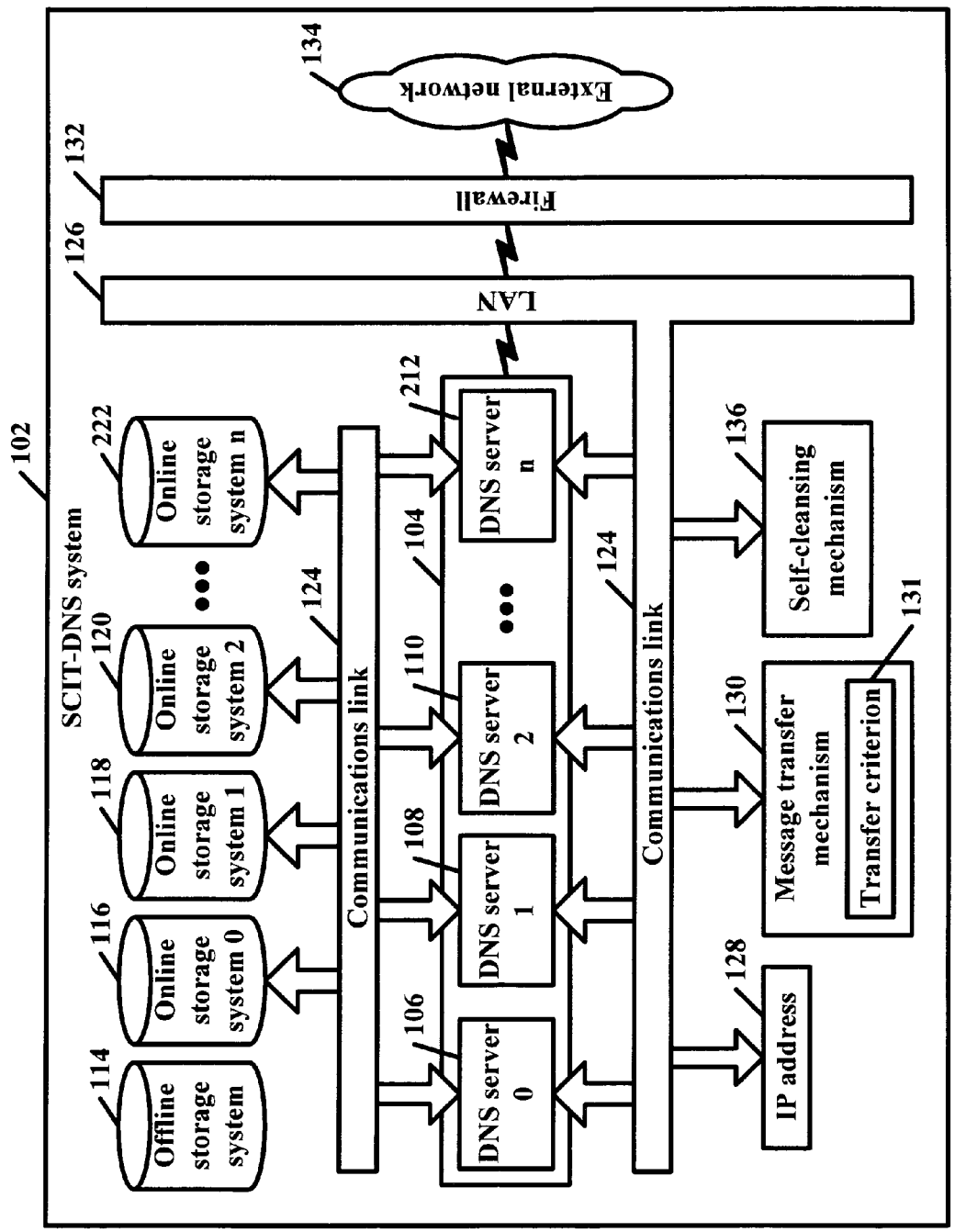
FIG. 2 shows a block diagram of a SCIT-DNS system as per another embodiment of the present invention.

As shown in FIGS. 1 and 2, backend storages, including offline storage system 114 and online storage systems 116, 118, 120, 222 (where n>2), may also be present. Ordinarily, the offline storage system 114 cannot be accessed by any server that is presently serving DNS clients in the public network. It is used to store the zone private key and the master file. In contrast, online storage systems 116, 118, 120, 222 (where n>2) are generally accessible by all servers, including those that are online. It is used to temporarily store requests for dynamic DNS updates. Backend storages can be implemented as Network File System (NFS) servers or storage devices attached to storage area networks. They may also be considered to be part of the intranet. To access data in backend storages, a server may need to first connect to the storage and then later disconnect. Examples of connections include Secure Shell (SSH) connections, NFS mounts, etc.

SCIT-DNS System

Taking a closer look at a SCIT-DNS system 102, attention now turns to the following preferred embodiment. The terms "DNS server" and "SCIT-DNS server" refer to either a SCIT-DNS server or a cluster of SCIT-DNS servers. The term "primary server" refers to a server having a primary role. The term "secondary server" refers to a server having a secondary role. The term "clean server" refers to a server having a self-cleansing role. The system 102 may include 3 or more DNS servers. If there are more than 3, the system may incorporate the term "nth server," where nth represents n number of DNS servers. The "nth server" refers to a server having an nth role. The term "designated server" refers to a server having a designated role, such as primary role, secondary role, nth role and self-cleansing role.

A SCIT-DNS system 102 may be developed to implement the SCIT-DNS architecture. As shown in FIGS. 1 and 2, this system 102 may comprise at least three DNS servers 106, 108, 110, 212. Although the DNS servers 106, 108, 110, 212 need not be identical, they should have the capability of functioning identically with regard to the overall systems capabilities. As shown in FIGS. 1 and 2, DNS servers 106, 108, 110, 212 may be servers, computers or personal computers ("PCs"), such as Intel/Linux PCs. Alternatively, each of the PCs which may be manufactured by a different manufacturer and containing non-identical hardware. The individual capabilities of each of these discrete DNS servers 106, 108, 110, 212 may be different; however, each of these discrete DNS servers 106, 108, 110, 212 must be capable of performing their critical functions as viewed from external locations, such as a local area network (LAN) 126.

Furthermore, this system 102 may have at least four storage systems accessible by each of the DNS servers 106, 108, 110, 212. Among these storage systems include at least three online storage systems 116, 118, 120, 222 and at least one offline storage system 114. Each online storage system 116, 118, 120, 222 may store, organize, receive and/or retrieve queries and/or dynamic update. Furthermore, each online storage system 116, 118, 120, 222 may also function as a backend storage for storing, organizing, receiving and/or retrieving queries and/or dynamic updates.

A communications link 124 may be used to connect each DNS server 106, 108, 110, 212 to at least three of the storage systems 114, 116, 118, 120, 222. The link 124 aids each DNS server 106, 108, 110, 212 to communicate with one or more storage systems 114, 116, 118, 120, 222. The communications link 124 may be used as a vehicle for transferring and exchanging data, such as queries and/or dynamic updates.

To exemplify this connection, consider the following. First, each backend storage 114, 116, 118, 120, 222 in may be implemented as an Intel/Linux machine with local hard drives. To begin the connection, a port knocking message can be used to begin the connection. Two knocks on port 28,030 on a backend storage machine can open a designated port for the server shell script to establish an SSH channel. Such connections are often used to give clean servers access to the master file in the offline storage system 114, as well as one or more pending dynamic update requests stored in an online storage system 116, 118, 120, 222. The current primary server can also establish a connection to offline storage system 114 to store one or more incoming dynamic update requests.

Also included in this system 102 is a LAN 126. The communications link 124 may also be used to connect LAN 126 to at least two DNS servers. This link 126 may be part of LAN 126 and may be used as a vehicle for transferring and exchanging data, such as queries and/or dynamic updates.

LAN 126 may be used to connect at least two DNS servers (e.g., 106, 108) to the external network 134. The external network 134 is external relative to the SCIT-DNS system 102. The external network 134 may include many different networks or devices, such as but not limited to clients, computing networks, communications networks, and the public Internet.

One or more DNS servers (e.g., 106) may receive dynamic updates from the external network 134. These dynamic updates, which sometimes can be in the form of a request, may be stored in at least one online storage system (e.g., 116). However, the system 102 may use two or more DNS servers (e.g., 106, 108) to receive and answer queries from the external network 134. It may be the case where a DNS server (e.g., 106) that receives one or more dynamic updates also receives and answers one or more queries from the external network 134.

Each DNS server 106, 108, 110, 212 and each online storage system 116, 118, 120, 222 may perform system functions and may communicate with the external network 160. Each DNS server 106, 108, 110, 212 can alternate between an active or inactive state. Additionally, each DNS server 106, 108, 110, 212 can be in a designated state, such as a designated active state or designated inactive state. The designated state refers to a role, as further discussed below, in which a DNS server prepares to take. An active DNS server (e.g., 106) generally may perform system functions. It may also communicate with the external network 134. Quite the contrary, an inactive DNS server (e.g., 110) is usually not required to perform system functions and is not supposed to communicate with the external network 134. Each inactive DNS server (e.g., 110) may or may not be available to be designated as an active DNS server (e.g., 106, 108). This availability can be based upon many criterions, such as hardware status or software status. Both the active DNS server (e.g., 106) and the designated active DNS server should be able to share an IP address 128.

It is envisioned that in some systems, the active DNS server (e.g., 106) may actually be a plurality of active sub-DNS servers. The sub-DNS servers may be combined and used according to various topologies to serve differing desires. In such a system, inactive DNS servers (e.g., 110) may be substituted for any of the active DNS servers (e.g., 106).

Additionally, each of the DNS servers 106, 108, 110, 212 may be connected to at least one message transfer mechanism 130, such as a fast Ethernet switch. Depending upon the desired characteristics of the overall system 102, the message transfer mechanism 130 helps each DNS server 106, 108, 110, 212 rotate into a plurality of roles. Among the plurality of roles include, but are not limited to, a primary role, a secondary role, a designated role and a self-cleansing role.

In the primary role, the DNS server (e.g., 106) generally asks for dynamic updates. In the secondary role, the DNS server (e.g., 108) does not ask for dynamic updates. Rather, such server asks the DNS server (e.g., 106) having a primary role what updates it has. However, in both the primary and secondary role, the DNS server (e.g., 106, 108) can receive and/or answer queries.

In the designated role, the DNS server (e.g., 212) having this capacity prepares and/or awaits to enter the self-cleansing process. Preparation may include going offline. The designated role may be assigned to any DNS server 106, 108, 110, 212. Hence, the designated role can be assigned to a DNS server having a primary role, a secondary role, a tertiary role, and so on up to an nth role (where nth represents n number of DNS servers in the system 102). The designated role may also be a self-cleansing role.

In the self-cleansing role, the DNS server is to be self-cleansed or cleansed, as discussed below.

At any point in time in a system 102 having at least three DNS servers, there may be three roles in effect. For example, at one moment in time, DNS server 106 may perform in a primary role. DNS server 108 may perform in a secondary role. DNS server 110 may perform in a self-cleansing role. If the system 102 were to have n DNS servers, where n is greater than 2, then the plurality of roles may also include an nth role.

At another point in time, the message transfer mechanism 130 may rotate the roles of each server and allow each server to function in a different capacity. For instance, DNS server 106 (presently functioning in a primary role) may rotate and function as a DNS server having a secondary role. DNS server 108 (presently functioning in a secondary role) may rotate and function as a DNS server having a self-cleansing role. Following this pattern, then DNS server 110 (presently functioning in a self-cleansing role) may rotate and function as a DNS server having a primary role.

Coordination of rotating server roles may be accomplished using the SCIT-CCP protocol. The processing of knocks, in accordance with FIG. 7, may be implemented in a SCIT-CCP daemon running on every server in the cluster. Each DNS server 106, 108, 110, 212 can also run a local firewall independent of the firewall box as shown in FIGS. 1 and 2. The SCIT-CCP daemon on a server may receive incoming knocks through monitoring the log file produced by the local firewall.

At least one firewall 132 may be connected to the message transfer mechanism 130. The firewall 132, which can be a border/router firewall, may be running Linux. At least two public, routable IP addresses (one for each of at least two active DNS servers) may be used. Static Network Address Translation (NAT) may be used to provide a private, non-routable IP address for each of the DNS servers in the cluster. Linux IPTABLES may be used to perform address translation and packet filtering. When a server is assigned a new role in the cluster, either as a primary role or a secondary role, it may claim the IP address for that role using a gratuitous Address Resolution Protocol (ARP) announcement on the subnet. The server lifecycle algorithm may be coded in a shell script and executed, sometimes immediately, after booting or rebooting.

The message transfer mechanism 130 may be activated by a transfer criterion 131. The transfer criterion 131 may consider one or a combination of distinct criterions. Examples include, but are not limited to, a message(s), a fault detection criterion and an intrusion detection criterion. Messages (e.g., "CCP_ROTATE_ROLE", "GO_OFFLINE", etc.) can be instructions sent to one or more DNS servers 106, 108, 110, 212.

Time may also be part of the transfer criterion 131. For instance, a timer may be used to trigger transfer criterion 131 on regular intervals. Likewise, a clock may be used to trigger transfer criterion 131 at specific times.

A further aspect included in the system 102 is a self-cleansing mechanism 136. The self-cleansing mechanism 136 has the capability performing the self-cleansing role. It is preferable that the self-cleansing mechanism 136 begins the self-cleansing process on a DNS server having designated role. However, it is also envisioned that the present invention, after role rotation, allows the self-cleansing mechanism to perform the self-cleansing role on a DNS server having a role other than the designated role.

Self-cleansing (sometimes referred to as "cleansing") may be defined to include cleansing the SCIT-DNS system, integrity checking, updating the master file, rebooting, reloading, scanning, and/or auditing. It is important to note that these aspects of the self-cleansing process need not follow a particular sequential order. Rather, these aspects may be applicable during any stage of the self-cleansing procedure. Moreover, they may be repeated. Also, self-cleansing may be performed on at least one DNS server or cluster of DNS servers.

Rebooting aids in cleaning a DNS server's memory. Once a DNS server is cleaned, reloading typically follows.

Reloading may refer to a multitude of processes, each of which may be performed separately or in combination. One type of process includes taking one or more known clean copies and placing them back into the server that has been cleaned. A known clean copy is any critical "protectee" file of the system 102 that must be fully intact and uncorrupted for correct system operation. Often, protectee files never change. Examples of protectee files include the operating system, configuration files, applications files (the DNS servers), etc. A second type of process is taking information from secure site. A third type of process is taking the latest updated master file(s) and placing such file(s) into the clean server. It is preferable that an integrity check be performed on the latest updated master file(s) prior to reloading.

Generally, the master file is offline. Hence, it may be found in the offline storage system 114. The master file can be updated with a multitude of data, such as queries, dynamic updates, processed data, etc.

Integrity checking typically includes monitoring and maintaining file integrity. Using the self-cleaning mechanism 136, file integrity can be monitored and maintained in the system 102. This embodiment may be achieved using a variety of detection programs, such as Tripwire. Tripwire is a signature-based detection package. The package may be used to digitally sign important system files and directories (e.g., /sbin, /usr/bin, etc.). The signatures can be checked in the first step of the server lifecycle. In the case(s) where one or more inconsistencies exist, corresponding files can be recovered from a local read-only storage. These tasks may constitute the cleansing of SCIT-DNS systems.

Integrity checking may be used to verify that the self-cleansing process has left a cleaned DNS server (e.g., 110) in adequate form to take over operation. Preferably, an integrity check will verify that the DNS server (e.g., 110) has been restored to an operational status with any effects of an attack removed.

Usually, the copy of the master file on the server having a primary role is not signed. Corruption in this copy can be automatically corrected when the next server rotating into the primary role takes over. In this aspect of the server lifecycle, the new server having a primary role can use a new copy obtained directly from offline storage system 114.

Requests coming into a name server can be segregated using a DNS wrapper program, such as TCP Wrappers. The wrapper can listen on a port, such as port 53 (Transmission Control Protocol/User Datagram Protocol ("TCP/UDP")). The wrapper can also act as a proxy for an open-source implementation of DNS/DNSSEC. Furthermore, the wrapper can pass queries to the name server. However, it is likely the case that the wrapper would store incoming dynamic update data in a temporary file on the online storage machine associated with the server having a primary role. Generally, the dynamic updates are not incorporated into the master file until they have been verified during the next cleansing cycle.

Scanning involves detecting any existence of harmful content, such as viruses or worms, in a DNS server (e.g., 108). If any harmful content is detected, the self-cleansing mechanism 136 may be used to inactivate or deactivate the discovered harmful content.

Auditing deals with auditing aspects of the system 102, such as measurable events, self-cleansing and system performance. This audit capability may record any of these events in archives for further analysis.

Figure 4:
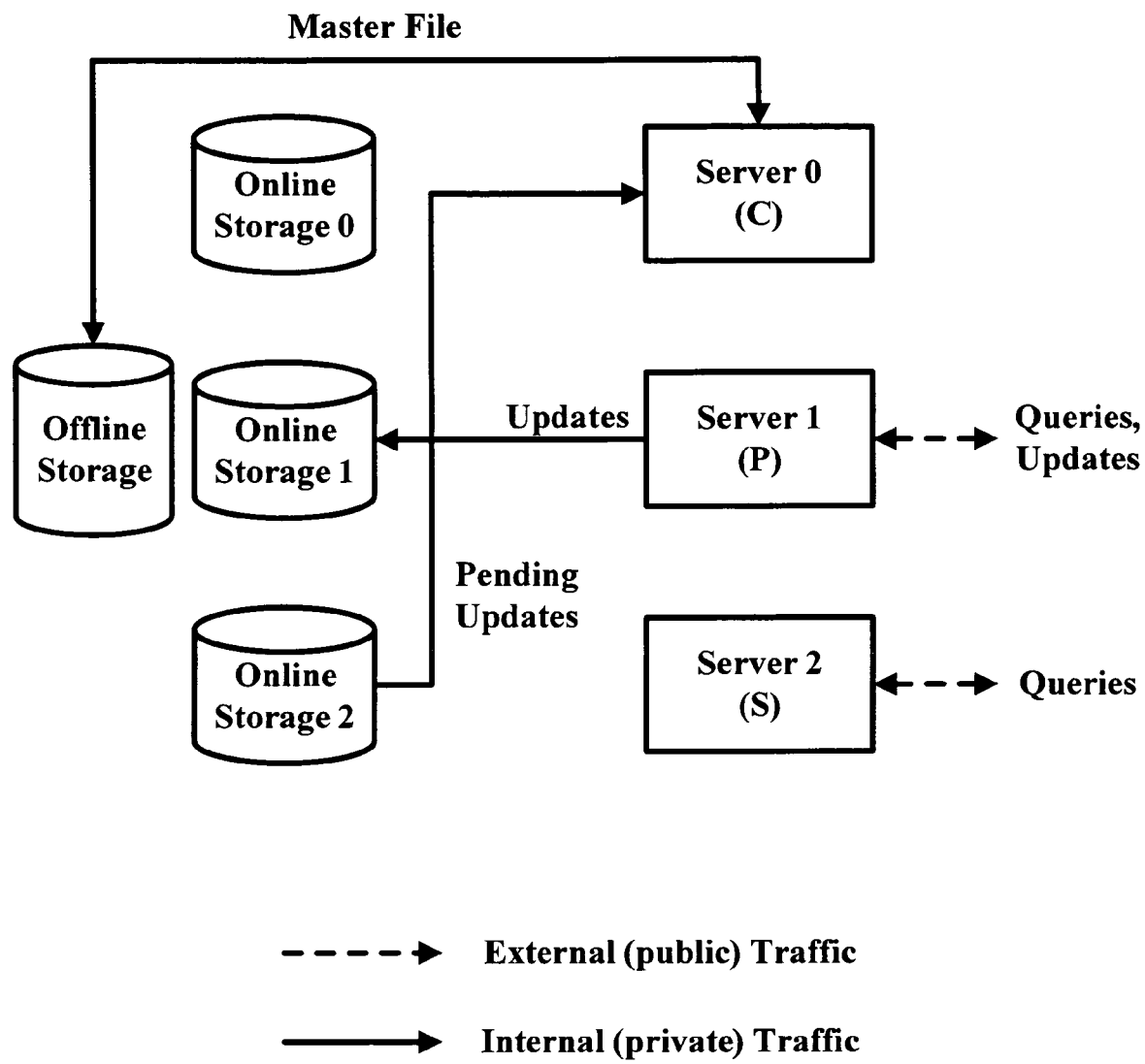
FIG. 4 shows a flow diagram of DNS server 1 serving in a primary role as per an embodiment of the present invention.
Figure 5:
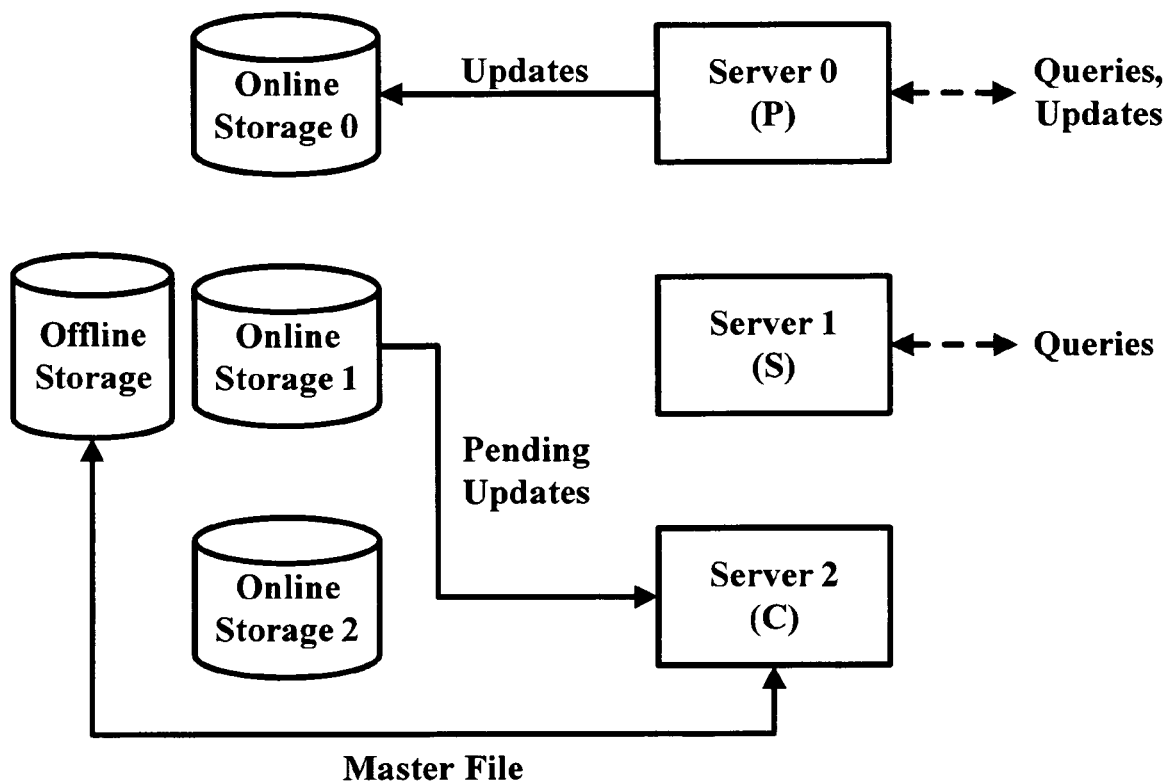
FIG. 5 shows a flow diagram of DNS server 0 serving in a primary role as per an embodiment of the present invention.
Figure 6:
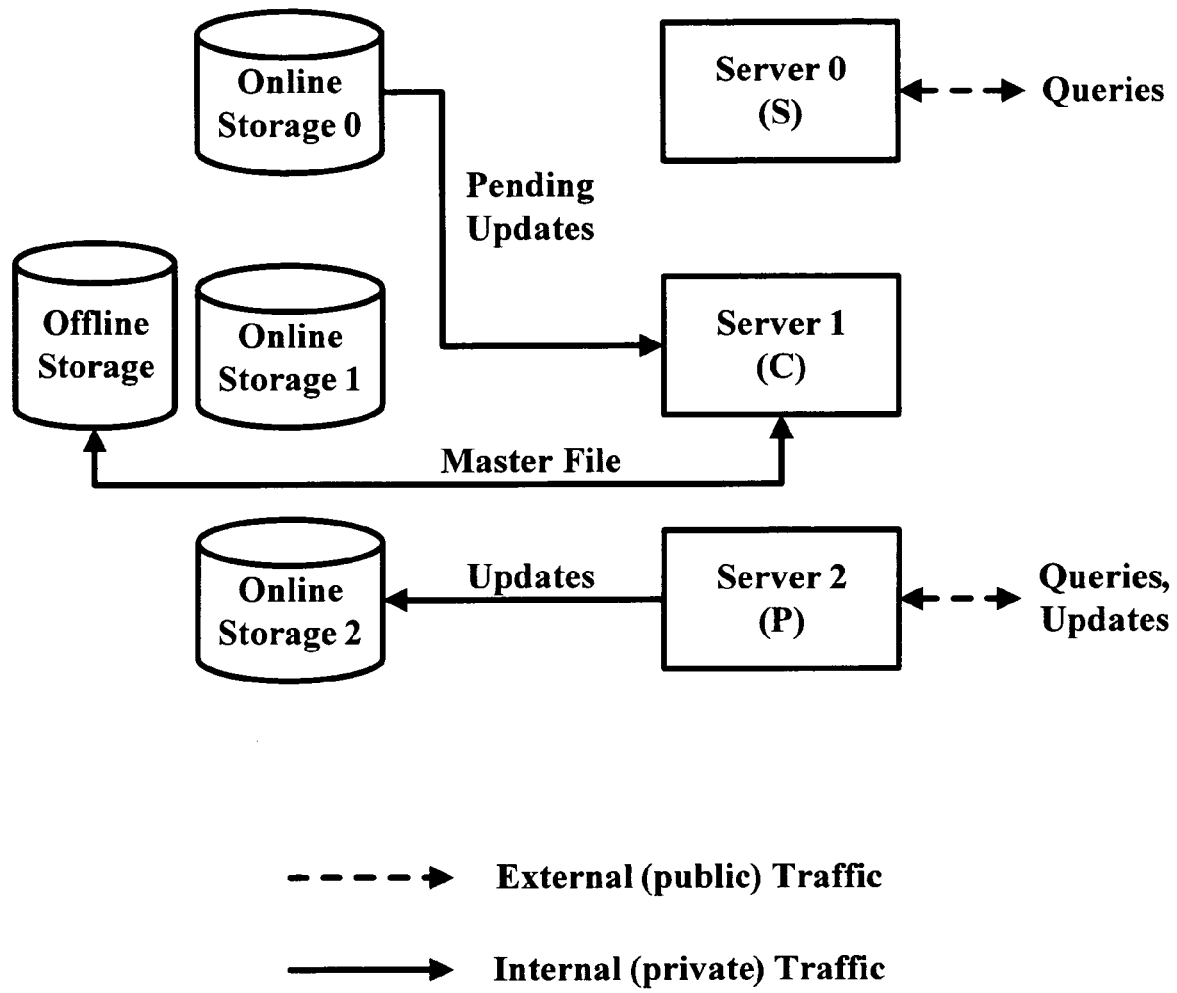
FIG. 6 shows a flow diagram of DNS server 2 serving in a primary role as per another embodiment of the present invention.

To illustrate examples of interactions among the servers and backend storages, attention now turns to FIGS. 4-6. Using arrows to show the communications paths in each stage of operation, these figures are embody one aspect of a complete cycle of the SCIT operation. Hence, illustration of the complete SCIT cycle is not limited to such depictions.

In FIG. 4, Server 1 is the current primary server (herein labeled "P"). Server 1 can answer DNS queries and receive requests of dynamic updates from the Internet. However, the processing of update requests may sometimes be postponed. Hence, these requests can be stored in Online Storage 1. In the mean time, Server 0 (herein labeled "C") may be rebooted. Server 2 is the secondary server (herein labeled "S") and can answer DNS queries. Server 0 may connect itself to Offline Storage and Online Storage 2. Server 0 can obtain a zone private key from Offline Storage. Server 0 can also retrieve one or more pending update request from Online Storage 2. Additionally, Server 0 can process one or more pending update request according to DNSSEC. Moreover, Server 0 can update the master file in Offline Storage. Furthermore, Server 0 can save a copy of the newly updated master file in its master storage. Server 0 may then disconnect from Offline Storage and eliminate the zone private key from its local disks and memory. By doing so, Server 0 should now be ready to initiate a role rotation by exchanging control messages with other servers through the SCIT Cluster Coordination Protocol.

FIG. 5 shows an example of the configuration after the above role rotation is achieved. Here, Server 0 assumes the role of primary server. Server 1 now becomes the secondary server. Server 2 reboots and restarts its lifecycle.

The configuration in FIG. 5 shows new requests of dynamic updates being stored in Online Storage 0 by Server 0. The newly rebooted and cleansed Server 2 can process pending updates, which may be received by the previous primary server and stored in Online Storage 1. Server 2 can also commit the updates to the master file in Offline Storage. Moreover, Server 2 can save a copy of the master file locally before initiating a role rotation.

FIG. 6 depicts an example of the configuration after the second rotation, whereby Server 2 becomes the primary server, Server 0 becomes the secondary server and Server 1 restarts its lifecycle. Here, one of more arriving update request can be stored in Online Storage 2. After rebooting, Server 1 can process one or more pending update in Online Storage 0. Server 1 can also update the master file in Online Storage 1. Then, Server 1 can initiate a role rotation. Once initiated, the system can return to the configuration as exemplified in FIG. 4, where one or more pending request collected in this phase and stored in Online Storage 2 may be processed by Server 0.

With such configurations in mind, the lifecycle of a SCIT-DNS server 106, 108, 110, 212 may be provided as below. It should be noted that in the lifecycle, the arithmetic may be in modulus 3. It is this lifecycle that highlights the self-cleansing procedure of a DNS server.

Figure 8:
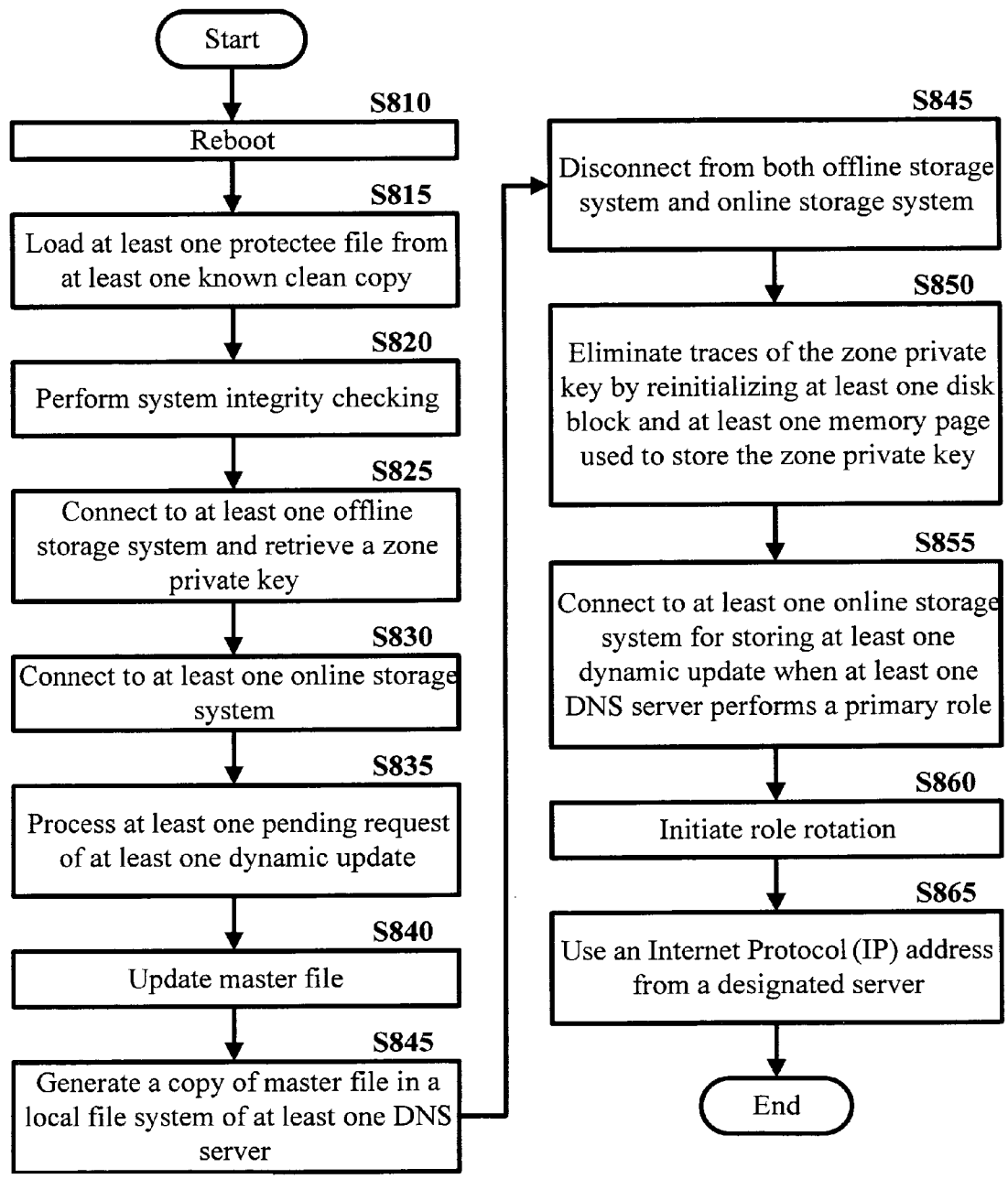
FIG. 8 shows a block diagram of method of self-cleansing a DNS server as per an embodiment of the present invention.
Figure 9:
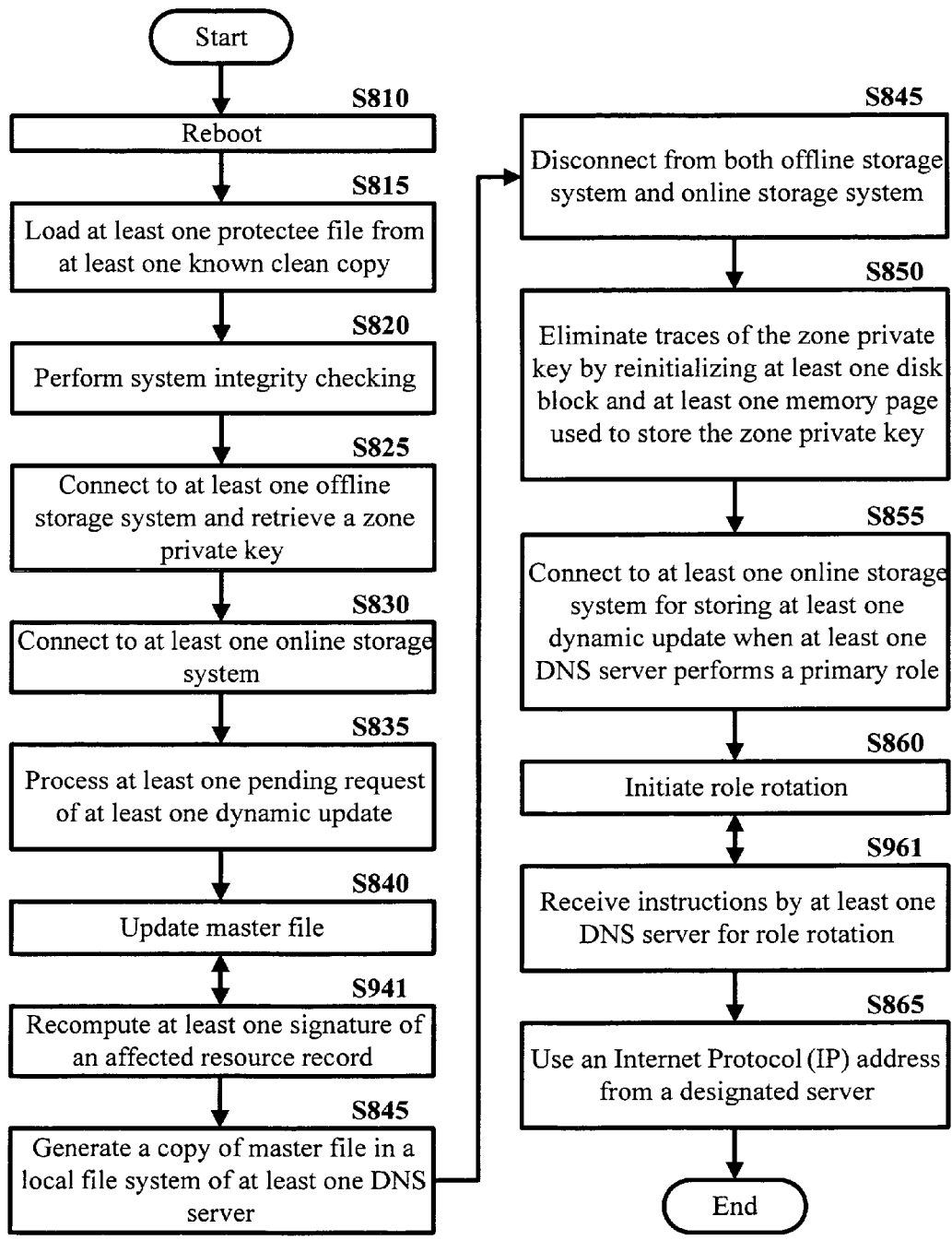
FIG. 9 shows a block diagram of method of self-cleansing a DNS server as per another embodiment of the present invention.

Referring to FIGS. 8 and 9, the first step may be rebooting S810. After rebooting, one or more protectee files from at least one known clean copy are preferably loaded S815. Next, system integrity checking, and if necessary, recovery procedures, ought to be performed S820. This step may involve checking the signatures of important system files and directories. In another step, a SCIT-DNS server should be connected to one or more offline storage systems S825. A zone private key may be retrieved S825. In yet another step, the SCIT-DNS server should be connected to at least one online storage system S830. One or more pending request of dynamic updates stored in the online storage system may be processed S835. One way of processing such updates is using RFC2136. The master file, which can be new or previously updated, may be updated in the process S840. Furthermore, at least one signature of an affected RR may be recomputed using the zone private key S941. In yet another step, it is preferable to generate a copy of the newly updated master file in a local file system of at least one SCIT-DNS server S845. In yet another step, the SCIT-DNS server may be disconnected from both one or more offline storage systems and one or more online storage systems S845. In yet another step, any trace (but preferably, all traces) of the zone private key should be eliminated S850. This step may be achieved by reinitializing at least one disk block and at least one memory page used to store the zone private key. In yet another step, the SCIT-DNS server may be connected to an online storage system S855. Such connection may permit the storage of one or more incoming DNS dynamic updates when SCIT-DNS server performs a primary role. In yet another step, role rotation may be initiated S860. To do so, one or more SCIT-DNS servers should receive instructions for role rotation S961. Instructions may come by way of at least one message, such as a CCP ROTATE_ROLE message. Afterwards, the IP address of a designated server may be claimed S865.

A further step may include having the SCIT-DNS server assume the role of the primary server. In this capacity, the SCIT-DNS server can answer DNS queries using its local copy of the master file. The SCIT-DNS server can also receive one or more dynamic update request. Moreover, the SCIT-DNS server can store one or more dynamic update request. Furthermore, the SCIT-DNS server can honor one or more of a secondary server's requests for DNS data synchronizations. In yet another step, the SCIT-DNS server may claim the IP address of the secondary server upon receiving instructions for role rotation. Instructions may come by way of one or more messages, such as a ROTATE_ROLE CCP message. In yet another step, the SCIT-DNS server may assume the role of the secondary server. Once assumed, it may answer DNS queries. It may also synchronize its local DNS data with the new primary server. Synchronization may be based upon RFC1035. However, it may reject one or more dynamic update requests. In yet another step, upon receiving instructions to go offline, the SCIT-DNS server may reboot. These instructions may come by way of one or messages, such as a GO_OFFLINE CCP message.

To prevent breaching of any of the SCIT-DNS servers, it is preferable to make sure no communication paths exist at all times from the outside to the Offline Storage. As illustrated in FIGS. 4-6, no communication paths are present. It is also preferable that the zone private key always be offline. Additionally, it is preferable that no communications path be present from the outside to the servers labeled "C." "C" servers are generally those that have been newly cleansed but have not yet gone online. A server may be deemed as "clean" if it has completed the above steps leading to and including the step of initiating role rotation using the CCP ROTATE_ROLE message, and claiming the primary server's IP address.

Cluster Coordination Protocol (CCP)

A SCIT Cluster Coordination Protocol generally helps manage the server role rotations within a SCIT-DNS cluster 104. SCIT-CCP is designed to enable the intra-cluster communication necessary to affect server role rotations. At the same time, SCIT-CCP is designed not to provide any connections between the DNS servers in the cluster. By not maintaining active connections between the servers in the cluster, the present invention does not keep any ports open other than necessary ones, such as those used for DNS transactions. Doing so may help eliminate the possibility of an attacker gaining control of one server in the cluster and/or using it as a foothold to compromise one or more machines in the cluster. To communicate cluster management messages without intra-cluster connections, the present invention may use port knocking.

Port knocking may be defined as an attempted connection to a port that is closed but is being monitored. Port knocking can be used as a channel for transporting messages across closed ports. By looking for predefined sequences of port knocks, servers can exchange critical control information without having to open a port and/or expose themselves to attacks. However, this mechanism is not typically used for data exchange. To use port knocking for the protocol's transport mechanism in the present invention, a range of ports may be chosen for communication. For example, ports 28,000 through 28,100 may be used. As one embodiment of the present invention, it is preferable that secure implementations of port knocks use per-machine firewalls. Available on modern operating systems, the per-machine firewalls can block the chosen port range. They may even suppress the sending of Internet Control Message Protocol (ICMP) error messages to clients attempting to connect to the chosen ports. One way to see port knocking activities is through monitoring firewall log files.

Messages types may be defined in CCP. As shown in Table 1, a destination port may be selected for a particular message type.

TABLE 1

SCIT-CCP Messages and Ports

| Message Type | Destination Port |
|---|---|
| ROTATE_ROLE | 28,010 |
| ACK_ROTATE_ROLE | 28,011 |
| GO_OFFLINE | 28,020 |
| ACK_GO_OFFLINE | 28,021 |

Each message may be comprised of two identical knocks. Also, an acknowledge message (ACK) may be located at the message level instead of the individual packet/knock level. This position can be the case since messages of the present invention may be two packets long and, furthermore, do not necessarily require sequencing.

A knock in CCP can be a Transmission Control Protocol/Synchronization (TCP/SYN) packet sent to a designated port on the receiving machine. The destination address of a knock can be the IP address that is associated with the "role" of the intended receiver. The destination port number may be determined by the type of the message as defined in Table 1.

Besides the SYN flag, source address, destination address and destination port, other fields of the TCP/IP headers are typically not used.

SCIT-CCP can be embedded in a tangible computer readable medium, such as but not including to a compact disc, digital video disc, floppy disc, flash memory, etc. A processor having a memory (e.g., a computer, personal digital assistant, etc.) may execute the following SCIT-CCP procedures.

Figure 10:
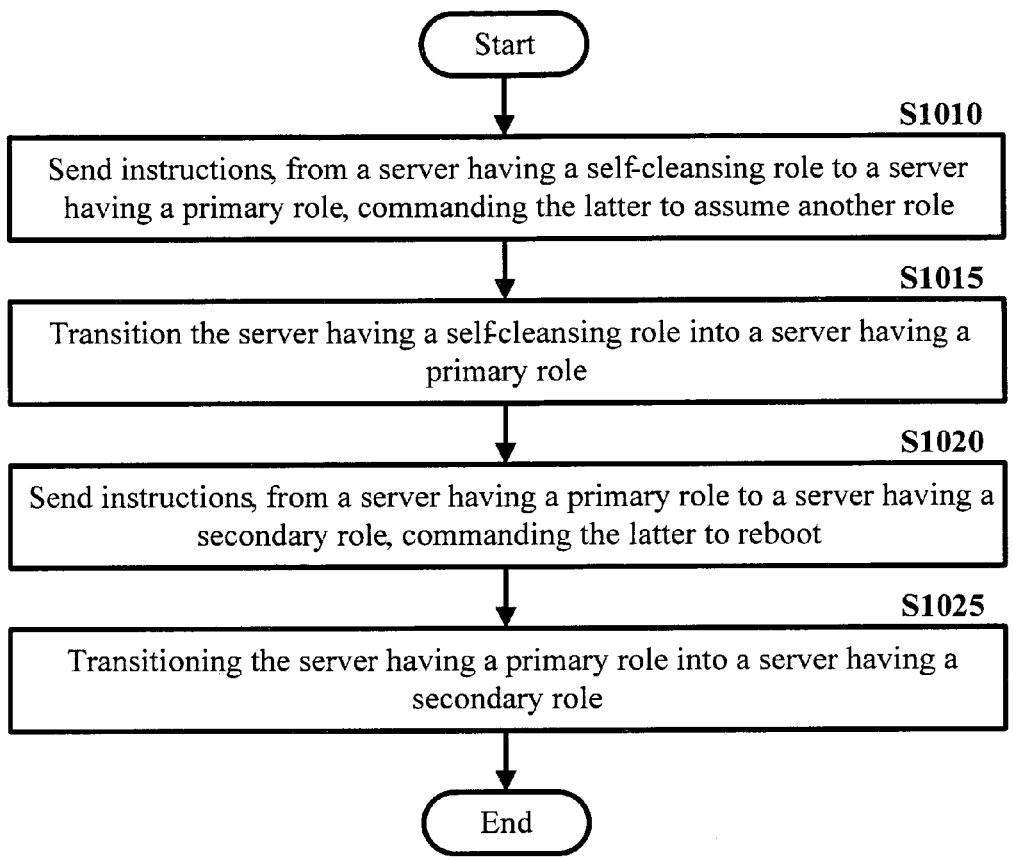
FIG. 10 shows a block diagram of a method of role rotation as per an embodiment of the present invention.
Figure 11:
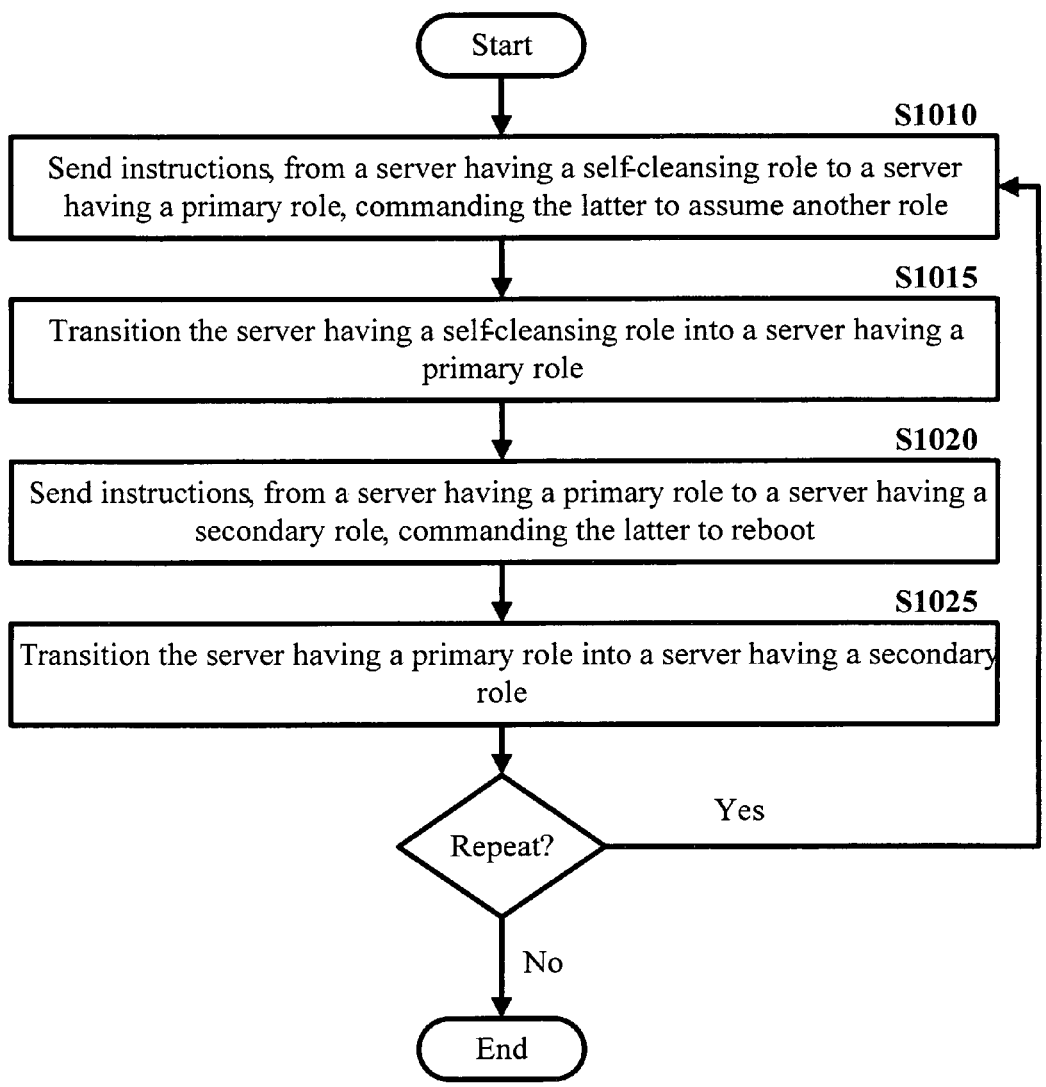
FIG. 11 shows a block diagram of a method of role rotation as per another embodiment of the present invention.
Figure 12:
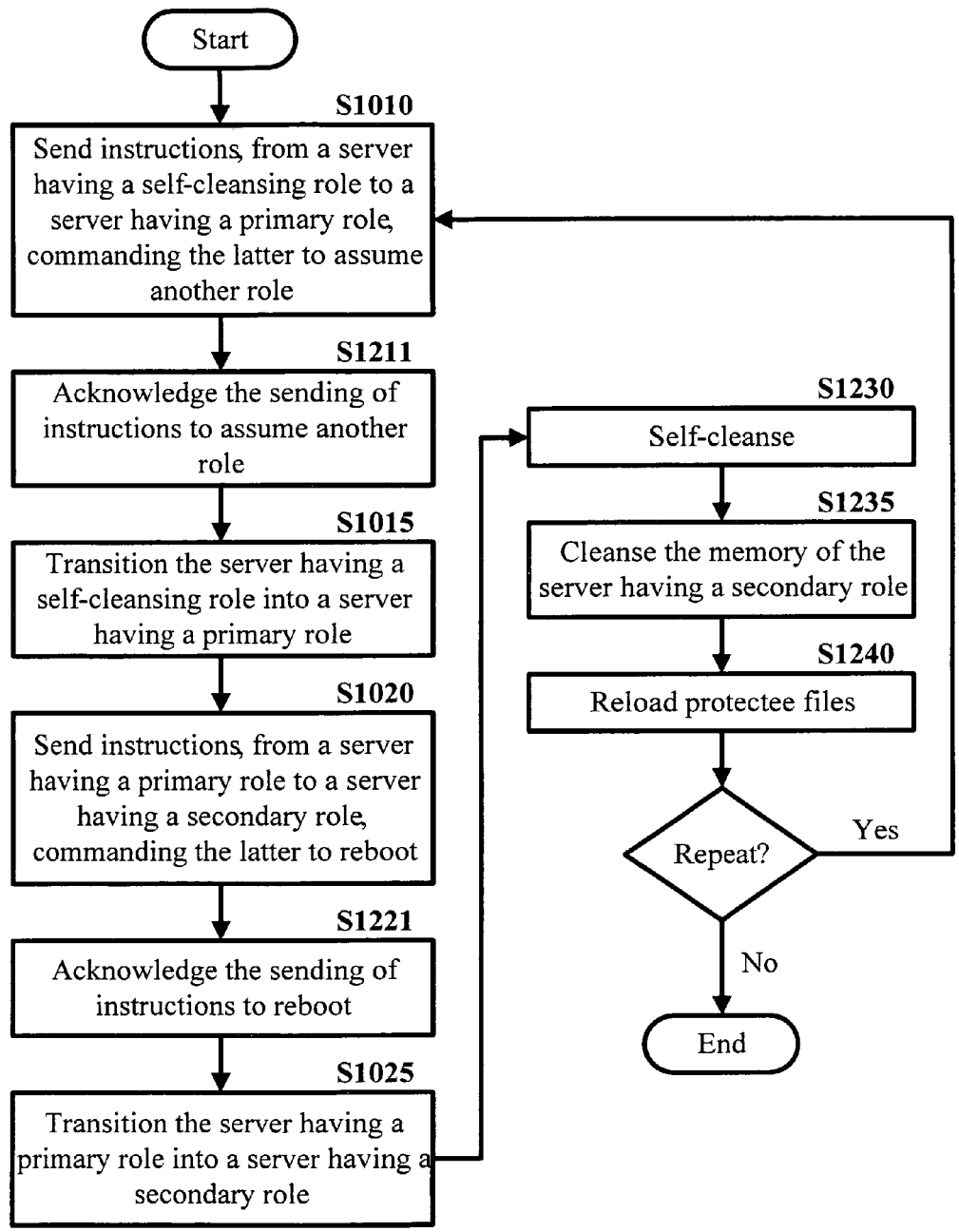
FIG. 12 shows a block diagram of a method of role rotation as per another embodiment of the present invention.

Referring to FIGS. 10, 11 and 12, instructions may be sent from a server having a self-cleansing role to a server having a primary role S1010. These instructions may command the server having a primary role to assume another role. In response, albeit not necessary, the server having a primary role may acknowledge these instructions for role rotation S1211. Whether acknowledgement is made or not, the server having a self-cleansing role may simply transition into a server having a primary role S1015.

Additionally, instructions may be sent from a server having a primary role to a server having a secondary role S1020. These instructions may command the server having a secondary role to reboot. Like above, the server having a secondary role may, in response, albeit not necessary, acknowledge these instructions S1221. Whether acknowledgement is made or not, the server having a primary role may simply transition into a server having a secondary role S1025.

Furthermore, instructions may include the step of self-cleansing S1230. In responding to reboot instructions, the memory of the server having a secondary role may be cleansed S1235. Also, once the server having a secondary role is rebooted, protectee files may be reloaded S1240. This self-cleansing may lead to a clean server. After this cycle is completed, it may be repeated.

Figure 13:
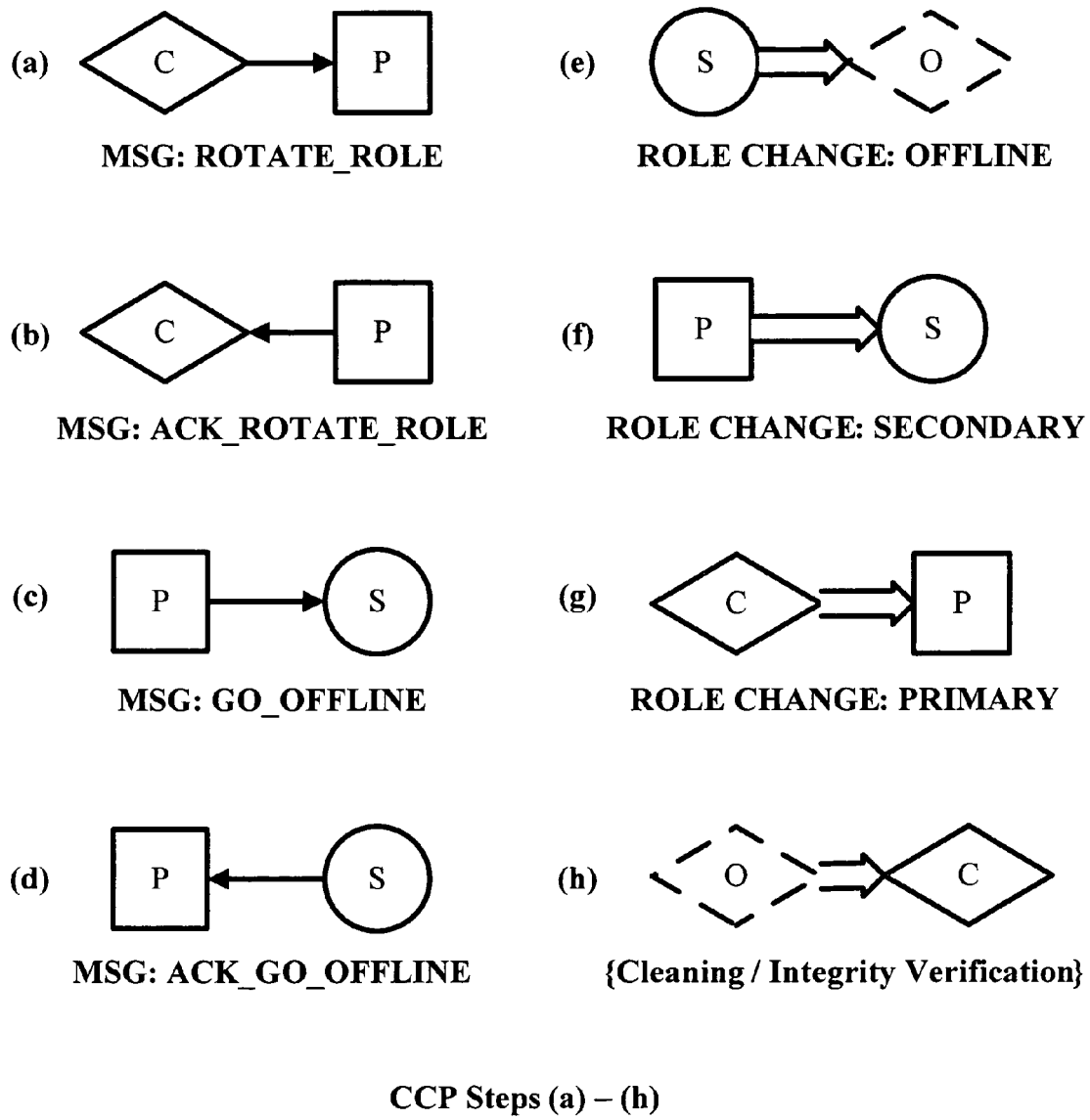
FIG. 13 shows CCP steps as per an embodiment of the present invention.

To demonstrate the SCIT-CCP in action, consider the following example. As depicted in FIG. 13, one cycle of the protocol at the message level is illustrated to demonstrate its operation within a SCIT-DNS cluster. Rotation may begin with the Clean Server ("C server") coming online and being ready to takeover the role as the Primary DNS server. The C server may send a ROTATE_ROLE message, to the current primary server ("P server"). In response, P server may send back an ACK_ROTATE_ROLE message. Next, the Primary server may send a GO_OFFLINE message to the current Secondary server ("S server"). The S server may reply with an ACK_GO_OFFLINE message.

The first role change may occur when the S server immediately goes offline to begin the cleansing and integrity verification process. With the Secondary role now open, P server may transition into this role by acquiring the IP address for the Secondary DNS server by a gratuitous ARP announcement to the cluster subnet. When C server sees the primary role vacated, it may broadcast its own gratuitous ARP announcement to claim the IP address for the Primary DNS role. The final state transition may be the process of restarting the Offline server ("O server"). Restarting may be followed by cleansing, integrity checking and master file updating. The result of this transition may be a new C server. This rotation process may be repeated.

Figure 7:
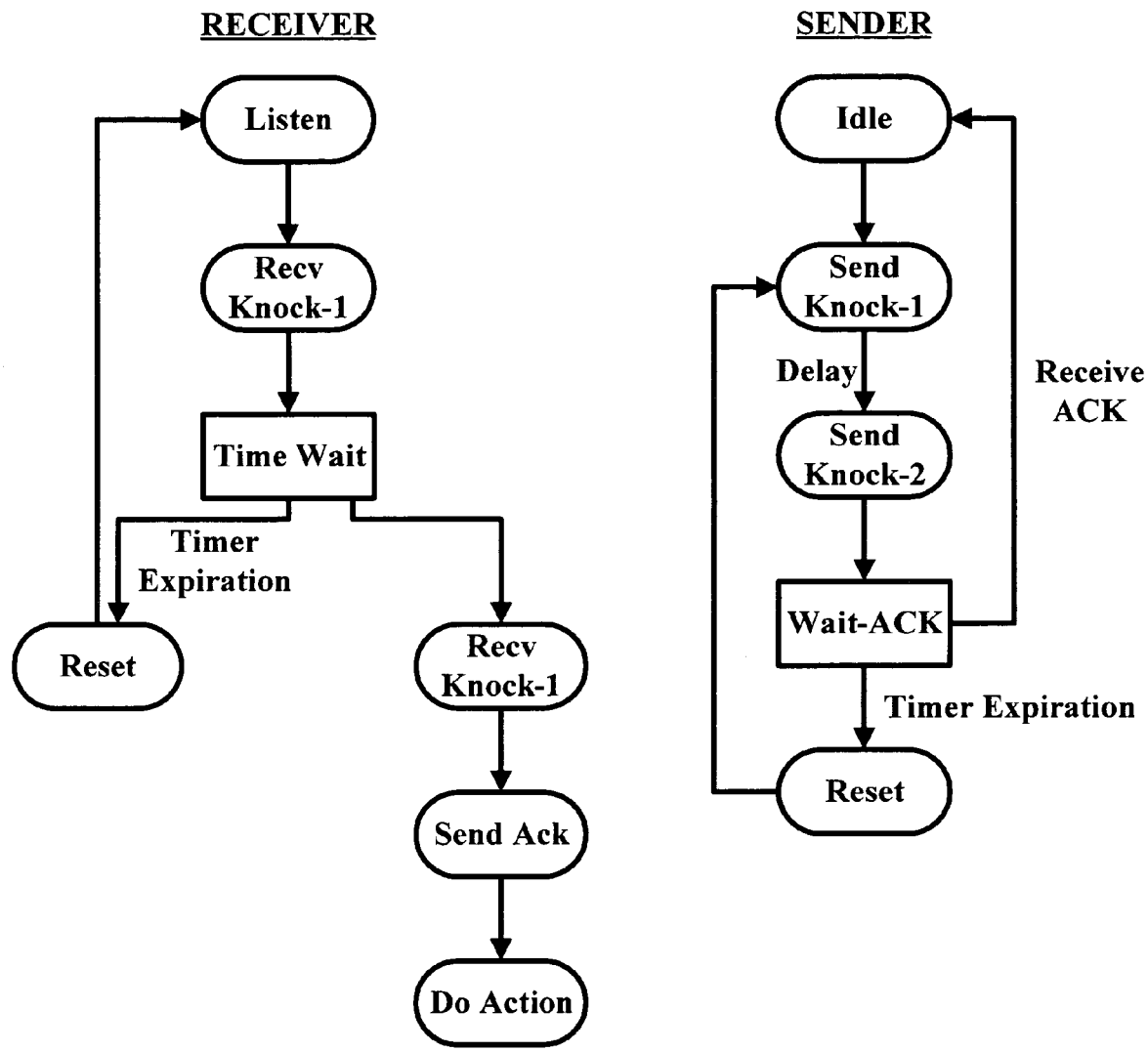
FIG. 7 shows a Self-Cleansing Intrusion Tolerance-Cluster Coordination Protocol (SCIT-CCP) as per an embodiment of the present invention.

FIG. 7 highlights examples of the state transition diagrams for CCP knock processing. These diagrams exemplify the process used to send and process both the ROTATE_ROLE and the GO_OFFLINE messages. The "do action" box in the diagram refers to either the claiming of the IP address associated with a server role change or the restating and cleansing process. Timeout lengths in the figure are those used in experimentation. These lengths are adjustable for different implementations.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that although the current best mode of this invention uses the self-cleansing method of rebooting followed possibly by data integrity checks and system audits, many layers of cleansing activities may be practiced in a SCIT system. In addition to rebooting the servers, one may kill and re-launch the server daemon. This process-level cleansing may impose less overhead, compared to system rebooting. Yet another system cleansing method may be to re-load dynamic kernel modules, in the attempt to clean up those kernel codes potentially contaminated by hostile communications. With self-cleansing activities occurring at several levels of the system and at different frequencies, SCIT may make it very difficult for attackers to cause actual harms, even if they are able to penetrate existing intrusion defenses.

What is claimed is:

1. A self-cleansing intrusion tolerance-domain name systems (SCIT-DNS) system comprising:
   a. at least three DNS servers;
   b. at least four storage systems accessible by said at least three DNS servers, said at least four storage systems including at least three online storage systems and at least one offline storage system;
   c. a communications link connecting:
      i. said at least three DNS servers with at least three of said at least four storage systems; and
      ii. at least two of said at least three DNS servers with a local area network, a message transfer mechanism, and a self-cleansing mechanism, said local area network capable of connecting said at least two of said at least three DNS servers to an external network; and
   d. said message transfer mechanism capable of rotating said at least three DNS servers into a plurality of roles, said plurality of roles including at least three of the following:
      i. a primary role;
      ii. a secondary role;
      iii. a designated role; and
      iv. a self-cleansing role; and
   e. said self-cleansing mechanism capable of performing said self-cleansing role on at least one of the DNS servers at a set time interval by assuming said at least one of the DNS servers as a failed server, whether or not any intrusion has occurred.

2. The system according to claim 1, further including at least one firewall.

3. The system according to claim 1, wherein at least one of said at least three DNS servers receives dynamic update requests from an external network.

4. The system according to claim 1, wherein at least two of said at least three DNS servers answer DNS queries.

5. The system according to claim 3, wherein at least one of said at least three online storage systems stores said dynamic update requests.

6. The system according to claim 1, wherein said communications link is part of said local area network.

7. The system according to claim 1, wherein said message transfer mechanism is activated by a transfer criterion.

8. The system according to claim 7, wherein said transfer criterion includes at least one of the following:
  a. at least one message;
  b. a fault detection criterion;
  c. an intrusion detection criterion; and
  d. time.

9. The system according to claim 1, further including a known clean copy.

* * * * *